United States Patent [19]

Lazzouni et al.

[11] Patent Number: 5,652,412
[45] Date of Patent: Jul. 29, 1997

[54] PEN AND PAPER INFORMATION RECORDING SYSTEM

[75] Inventors: Mohamed Lazzouni, Worcester; Ali Seyed Kazeroonian; Dariush Gholizadeh, both of Framingham; Omar Ali, Roslindale, all of Mass.

[73] Assignee: SIA Technology Corp., Southboro, Mass.

[21] Appl. No.: 273,396

[22] Filed: Jul. 11, 1994

(Under 37 CFR 1.47)

[51] Int. Cl.⁶ ............................................ G08C 21/00
[52] U.S. Cl. .................... 178/18; 345/175; 345/179; 341/13; 235/456
[58] Field of Search .............................. 345/156, 173, 345/175, 179, 180, 181, 182; 178/18, 19, 20, 97; 250/227; 235/456, 470; 341/13; 340/710

[56] References Cited

U.S. PATENT DOCUMENTS

| | | | |
|---|---|---|---|
| 3,735,350 | 5/1973 | Lemelson | 340/146.3 |
| 3,918,029 | 11/1975 | Lemelson | 340/146.3 |
| 4,420,682 | 12/1983 | Huber | 235/472 |
| 4,445,028 | 4/1984 | Huber | 235/472 |
| 4,448,837 | 5/1984 | Ikeda et al. | 428/215 |
| 4,467,196 | 8/1984 | Balliet et al. | 250/227 |
| 4,572,952 | 2/1986 | March | 250/237 |
| 4,639,070 | 1/1987 | Ikeda et al. | 350/3.71 |
| 4,668,858 | 5/1987 | Heuwieser et al. | 235/472 |
| 4,682,016 | 7/1987 | Inoue | 235/462 |
| 4,688,933 | 8/1987 | Lapeyre | 356/1 |
| 4,712,100 | 12/1987 | Tsunekuni et al. | 340/710 |
| 4,723,836 | 2/1988 | Kono et al. | 350/331 R |
| 4,728,784 | 3/1988 | Stewart | 235/462 |
| 4,731,526 | 3/1988 | Knoll et al. | 235/472 |
| 4,766,404 | 8/1988 | Ishida et al. | 355/7 |
| 4,794,634 | 12/1988 | Torihata et al. | 379/96 |
| 4,814,760 | 3/1989 | Johnston et al. | 340/784 |
| 4,818,851 | 4/1989 | Kimura | 235/472 |
| 4,839,634 | 6/1989 | More et al. | 340/712 |
| 4,856,077 | 8/1989 | Rothfjell | 382/3 |
| 4,860,372 | 8/1989 | Kuzunuki et al. | 382/13 |
| 4,877,949 | 10/1989 | Danielson et al. | 235/462 |
| 4,936,683 | 6/1990 | Purcell | 356/152 |
| 4,947,156 | 8/1990 | Sato et al. | 340/707 |
| 4,959,805 | 9/1990 | Ohouchi et al. | 364/562 |
| 4,977,315 | 12/1990 | Purcell | 250/221 |
| 5,012,049 | 4/1991 | Schier | 178/19 |
| 5,017,913 | 5/1991 | Kaneko et al. | 340/712 |
| 5,038,024 | 8/1991 | Chadima, Jr. et al. | 235/472 |
| 5,047,617 | 9/1991 | Shepard et al. | 235/467 |
| 5,051,736 | 9/1991 | Bennett et al. | 340/707 |
| 5,075,558 | 12/1991 | Nakagawa | 250/556 |
| 5,086,197 | 2/1992 | Liou | 178/18 |
| 5,099,109 | 3/1992 | Ishikawa et al. | 235/462 |
| 5,128,526 | 7/1992 | Yoshida | 235/456 |
| 5,128,528 | 7/1992 | Heninger | 235/470 |
| 5,214,426 | 5/1993 | Minohara et al. | 341/13 |
| 5,347,275 | 9/1994 | Lau | 345/175 X |

*Primary Examiner*—Stella Woo
*Assistant Examiner*—Paul Loomis
*Attorney, Agent, or Firm*—Wolf, Greenfield & Sacks, P.C.

[57] ABSTRACT

An information recording system includes a writing paper having a writing surface and a prerecorded invisible pattern of pixels associated with the writing surface. Each of the pixels contains encoded, optically readable position information which identifies a coordinate position on the writing surface. The system further includes a pen having a tip and including an instrument for writing on the writing surface and a detector for detecting the position of the tip on the writing surface by optically reading the pixels and obtaining position information when the tip is in contact with the surface. The system further includes a recording unit coupled to the pen and responsive to the position information for electronically recording the position of the pen tip on the writing surface as the markings are made on the writing surface so that the recording unit contains an electronic representation of the markings on the writing surface.

24 Claims, 15 Drawing Sheets

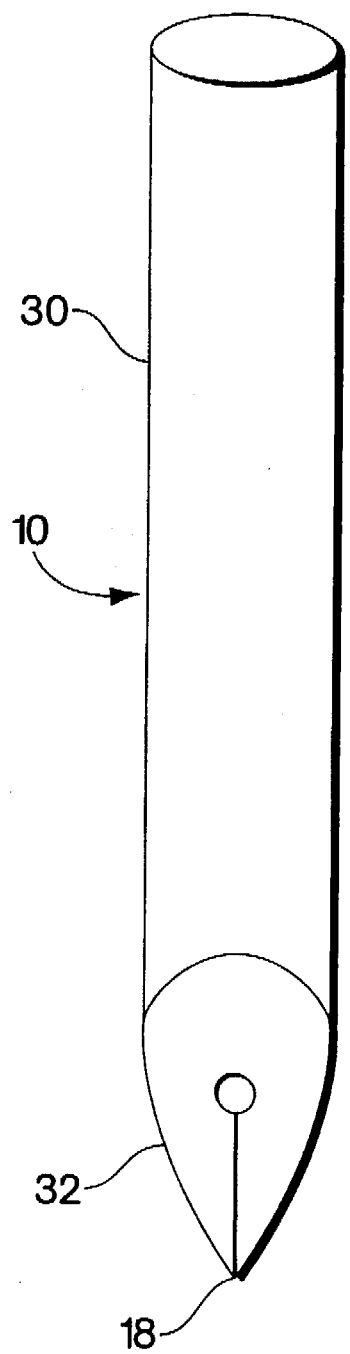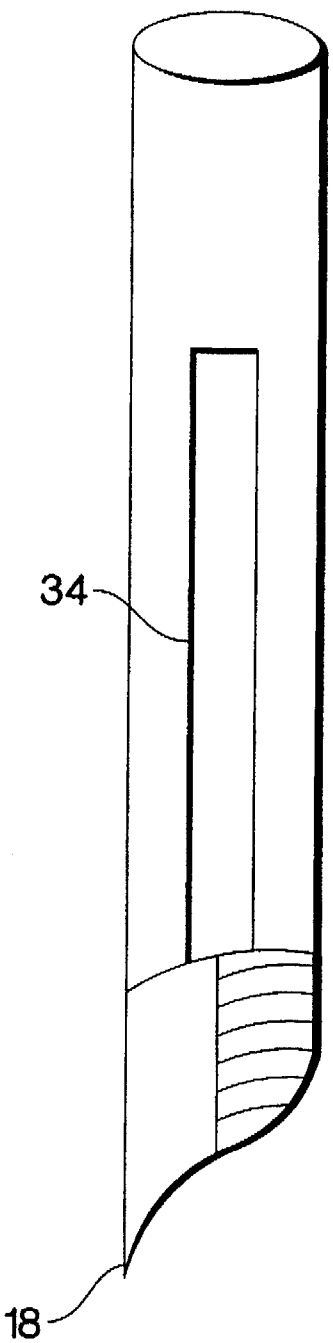
Fig. 2A
Fig. 2B

PEN AND PAPER INFORMATION RECORDING SYSTEM

FIELD OF THE INVENTION

This invention relates to data input devices and, more particularly, to a system for recording information in a memory simultaneously with writing on encoded paper.

BACKGROUND OF THE INVENTION

Two-dimensional input devices for inputting handwritten data and text, sketching and drawing into a host computer are relatively well known. Most of these applications require the transfer, in real time, of a pen or stylus position on a tablet to a host computer for storage, processing or display. In these applications, it is desirable to have both a handwritten record of the activity and a record in a memory. It is also desirable to perform these functions without the need for a host computer, thus permitting portable and field use of the input device.

Currently available pen-based computer systems are self contained and utilize a central processing unit and an operating system. An active tablet or a passive tablet is a peripheral device to a host computer, which records coordinate position information. All known systems have serious limitations.

Currently available active tablets can be functionally classified as inductive, transparent digitizing, resistive, acoustic, laser scanning and the like. These tablets have deficiencies in resolution, accuracy, robustness, cost, uniform resistivity, drift, size, weight, reliability, and the like. For example, inductive tablets have problems with electrical noise and field distortion from nearby metallic objects. These tablets must be attached to a host computer which limits portable and field use.

Prior art passive tablets typically fall into in two categories. The first category is the well known mouse device which uses a surface to enter relative positional data into a system. The second category normally utilizes a stylus pickup device, which provides relative or absolute position as the moving stylus is passed over a tablet surface containing grid lines in the X and Y directions. Current systems of the second category suffer from lack of resolution for applications such as handwriting and graphical drawing.

Prior art encoded paper using bars of printed lines generally falls into two classes. In the first class, bars are placed adjacent to each other at spaced regular or irregular intervals, are aligned vertically and are sequenced in one direction. Methods for reading encoded information from conventional bar codes and for decoding the bar code information are known in the art. This technique is used for inventory identification, pricing, adding the prices of goods and other applications. The bar code reader includes a light source for illuminating the elements of the bar code. Reflected light is directed with a series of optical elements onto an image photosensor.

U.S. Pat. No. 4,731,526 issued Mar. 15, 1988 to Knoll et al discloses a technique for determining navigation data from a map. A line code grid is imprinted on the map or on a separate foil. The line code includes vertical and horizontal lines that may differ as to width, distance, color, and the like. Fluorescing and phosphorescing inks are suggested. Infrared absorbing or reflecting substances are also disclosed. The line code is used to determine the position on a map using a light pen. In addition, the line code can be implemented as raised portions which are mechanically sensed.

Handwriting input techniques are disclosed in U.S. Pat. No. 4,947,156 issued Aug. 7, 1990 to Sato et al; U.S. Pat. No. 5,051,736 issued Sep. 24, 1991 to Bennett et al; U.S. Pat. No. 4,839,634 issued Jun. 13, 1989 to More et al; U.S. Pat. No. 4,856,077 issued Aug. 8, 1989 to Rothfjell; U.S. Pat. No. 4,814,760 issued Mar. 21, 1989 to Johnston et al; U.S. Pat. No. 4,860,372 issued Aug. 22, 1989 to Kuzunuki et al; U.S. Pat. No. 4,794,634 issued Dec. 27, 1988 to Torihata et al; U.S. Pat. No. 4,723,836 issued Feb. 9, 1988 to Kono et al and U.S. Pat. No. 4,448,837 issued May 15, 1984 to Ikeda et al.

French Patent No. 2,423,522 discloses information on fluorescent markings in the near infrared. The French patent discloses an ink, consisting of pigments from the rare earth group, which absorbs or emits in the infrared. These inks are designed for indexing documents such as envelopes, postal checks, tickets and similar applications.

It is a general object of the present invention to provide methods and apparatus for reading and storing coordinate information representative of the instantaneous position of a pen on a writing surface.

It is another object of the present invention to provide a writing paper having a prerecorded pattern of pixels, each pixel containing encoded location information which identifies an absolute and unique coordinate location on the paper.

It is a further object of the present invention to provide an information input system for simultaneously recording written information on encoded paper and recording the written information in a memory.

It is a further object of the present invention to provide a pen and paper information recording system which has high resolution, is accurate, reliable and low in cost, and allows multiple users to use several pens on one paper.

SUMMARY OF THE INVENTION

According to the present invention, these and other objects are achieved in information recording apparatus for use with paper having a prerecorded pattern of pixels associated with a writing surface. Each of the pixels contains encoded, optically readable position information which identifies an absolute coordinate position on the writing surface. The information recording apparatus comprises a pen having a tip and including means for making visible markings on the writing surface of the paper and means for detecting the position of the tip on the writing surface by optically reading the pixels and obtaining position information when the tip is in contact with the surface and visible markings are made on the writing surface. The visible markings do not hinder or deteriorate the encoded position information or the reading process. The apparatus further includes a recording unit coupled to the pen and responsive to the position information read by the detecting means for electronically recording the position of the tip of the pen on the writing surface as the visible markings are made on the writing surface so that the recording unit contains an electronic representation of the visible markings on the writing surface.

Preferably, the recording unit includes a portable housing separate from the pen and electronic circuitry located within the housing for receiving position information from the detecting means and for storing the position information. The means for making visible markings preferably includes a fountain pen or other writing instrument having a fountain pen configuration which requires the user to tip the pen in a preferred direction. The means for detecting the position of the tip preferably includes means for transmitting a light beam to the pattern of pixels and means for detecting reflected light or fluorescence from the pattern of pixels. The light beam preferably comprises radiation in a wavelength range including infrared radiation. The pen can be connected to the recording unit by one or more optical fibers. Alternatively, the pen can be coupled to the recording unit by a wireless optical or RF link.

According to another aspect of the invention, a writing sheet comprises a writing surface and a prerecorded pattern of pixels associated with the writing surface. Each of the pixels contains encoded, optically readable position information which identifies an absolute coordinate position on the writing surface.

Preferably, each of the pixels comprises a first plurality of vertical lines for encoding an X coordinate of the pixel and a second plurality of horizontal lines for encoding a Y coordinate of the pixel. Each pixel preferably further includes vertical and horizontal delimiter lines for defining the boundary of the pixel. In a preferred embodiment, the vertical and horizontal lines and the delimiter lines are formed by infrared reflective inks. In this case, the markings made by the pen are substantially transparent to infrared radiation. The position information can be encoded by different shades of the vertical and horizontal lines.

When the pen is used to write on the encoded paper, the position of the pen tip is determined by reading the pattern of pixels and storing the position information in the recording unit. Thus, the recording unit contains an electronic representation of the written record on the encoded paper. The stored data can be supplied to a host computer, either immediately or at a later time, thus permitting portable and field use of the information recording apparatus.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIGS. 2A and 2B schematically illustrate an example of a pen used in the information recording apparatus of FIG. 1;

DETAILED DESCRIPTION OF THE INVENTION

Information recording apparatus in accordance with the present invention includes an encoded paper, an electrooptical writing pen and a recording unit. The encoded paper is passive and is encoded with narrow lines which define pixels. The lines are preferably printed with infrared inks formed from organic compounds and, when printed on ordinary paper, are invisible to the human eye.

The pen comprises a writing instrument, such as a fountain pen or other writing instrument having a fountain pen configuration, and an optical reading system to illuminate the pattern of lines on the encoded paper and to pick up the resulting reflected light or fluorescence. The pen can be moved at speeds of about 4–7 inches per second. A light source and a detector for the optical reading system can be located either in the pen or in the recording unit. The optical reading system preferably comprises one or more light emitting diodes (LED's) as the light sources and one or more photodetectors located in the recording unit and connected by optical fibers to the pen, as described in detail below. Alternatively, the pen can be detached from the recording unit, with wireless RF or optical communication of the position information to the recording unit.

The recording unit may include the light source and the detector for the optical reading system, a microprocessor for processing and recording the position information and for controlling communication with a host computer, a memory for storing the position information, and a communication link for communicating with a host computer. The detector reads the position information as the pen passes over the pattern of pixels and provides signals representative of the pen location to the microprocessor. As described below, the light source and the detector can be located in the pen 10 or in the recording unit. The microprocessor decodes the detected signal and stores the coordinates of the pen in the memory.

The information recording apparatus of the present invention is designed for field or office use and may be used by sales or mobile personnel, mobile managers, students taking lecture notes, and the like. In a preferred embodiment, the encoded paper can be made in multisheet pads and can be made as a form or as blank paper, with or without visible reference lines. The information stored in the recording unit may be accessed at any time for display and printout.

Figure 1:
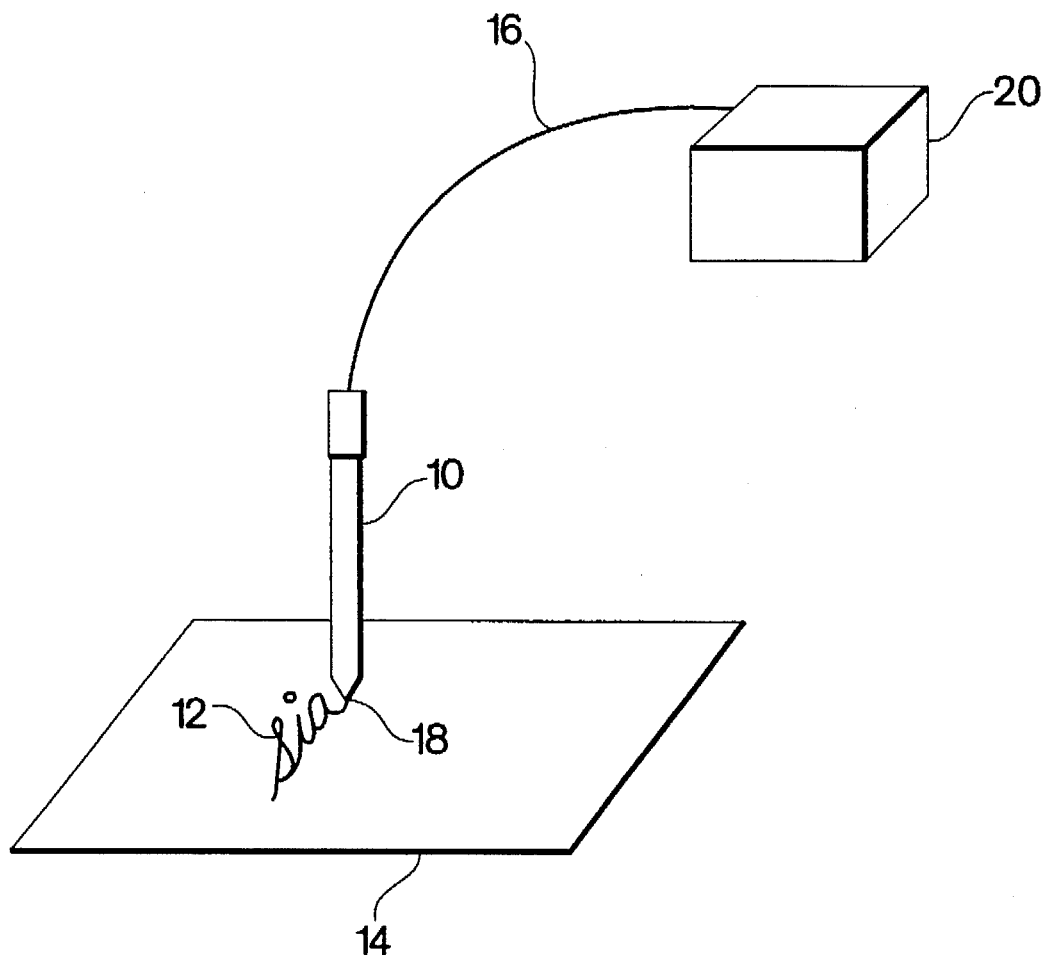
FIG. 1 is a pictorial representation of the information recording apparatus of the present invention.

A pictorial diagram of the information recording apparatus of the present information is shown in FIG. 1. A pen 10 is used for making visible markings 12 on an encoded paper 14. The pen is connected by a cable 16, which may include optical fibers and/or electrical conductors, to a recording unit 20. The visible markings 12, which can be handwriting, drawings or any other markings on a writing surface of encoded paper 14, are traced by a tip 18 of pen 10. Simultaneously, the absolute position of the tip 18 of pen 10 on the surface of paper 14 is determined by optically reading a pattern of prerecorded pixels associated with the surface of paper 14. The position information is transmitted through the cable 16 to recording unit 20, where it is stored for later use. The recording unit 20 thus contains an electronic representation of the markings 12.

An example of the pen 10 is shown schematically in FIGS. 2A and 2B. The pen 10 includes a housing or pen body 30, a writing nib 32 as in a conventional fountain pen, and an ink cartridge 34. The writing nib 32 channels ink from the ink cartridge 34 to the tip 18 to produce markings on paper 14. Alternatively, any other writing instrument that has a fountain pen configuration, which requires the user to tip the pen in a preferred direction, can be used for making markings on the encoded paper 14. The pen further includes an optical reading system (not shown in FIGS. 2A and 2B) for sensing the encoded information on paper 14. The optical reading system is described in detail below in connection with FIG. 3. The pen should be similar in size and shape to conventional writing instruments.

The ink cartridge 34 preferably contains an infrared transparent writing ink for writing on the encoded paper 14. The cartridge 34 can be filled or replaced. The fountain pen configuration limits the rotational excursion of the pen 10 during writing. By limiting rotation of the pen with the fountain pen configuration, distortion effects due to tilt of the pen axis with respect to the paper surface can be minimized.

Figure 3:
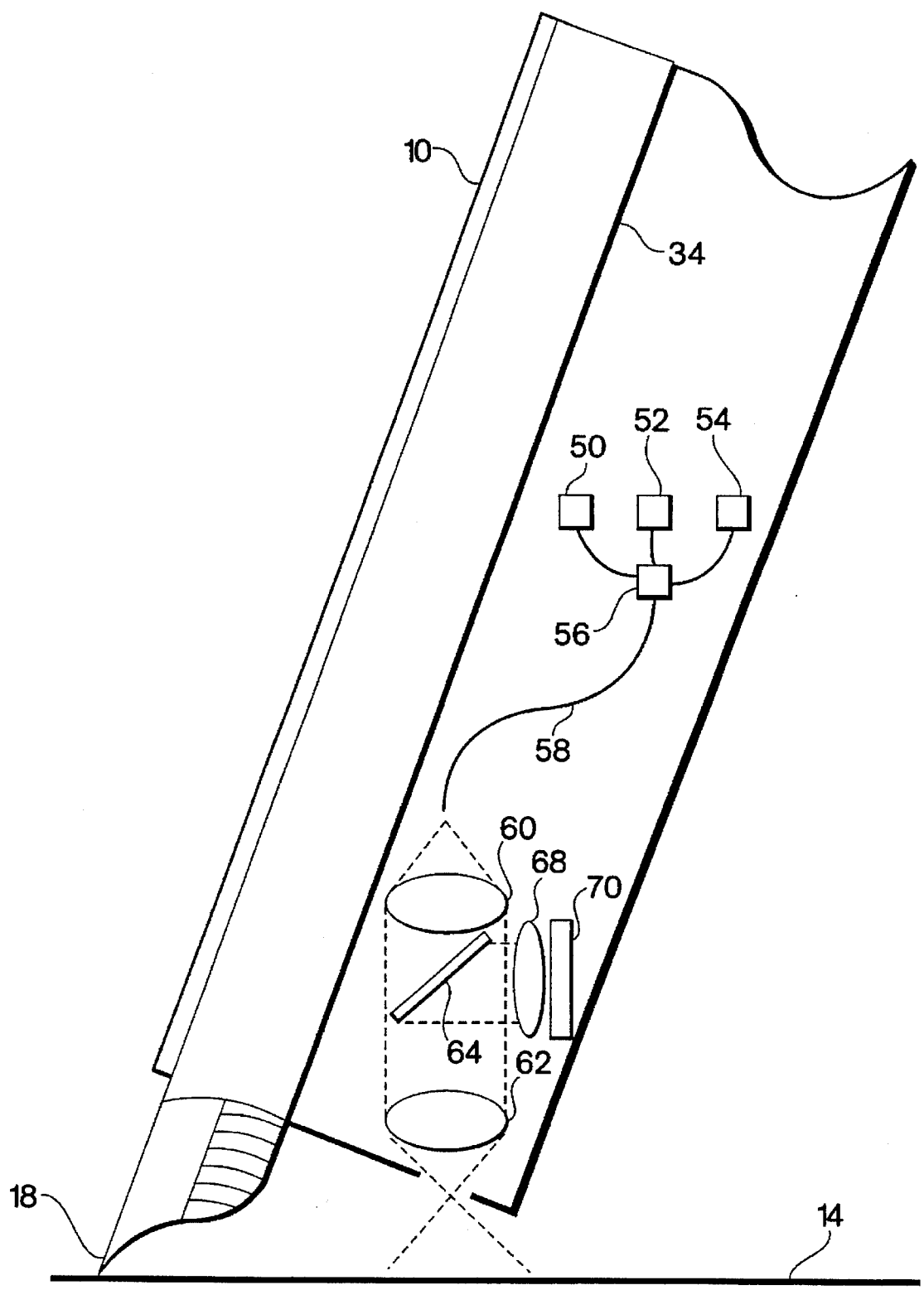
FIG. 3 is a schematic representation of an example of the pen, including the optical reading system.

A schematic representation of the pen 10, including the optical reading system, is shown in FIG. 3. LED's 50, 52 and 54 are used for illuminating the pixels on the encoded paper 14. The outputs of LED's 50, 52 and 54 are coupled by optical fibers to a fiber optic coupler 56. The output of fiber optic coupler 56 is directed through an optical fiber 58 and through a focusing lens 60, a beam splitter 64 and a collection lens 62 to the encoded paper 14. As indicated previously, the LED's 50, 52 and 54 can be located in the pen 10 or in the recording unit 20. When the LED's are located in the recording unit 20, the fiber optic coupler 56 is preferably located in the recording unit 20, and the outputs of the LED's 50, 52 and 54 are carried through cable 16 by optical fiber 58.

Each of the LED's transmits at a different wavelength. The three LED's are turned on and off sequentially such that only one LED is emitting at any instant of time. The light emitted from the optical fiber 58 is focused by lens 60 at a point between collection lens 62 and beam splitter 64. The focal point is selected such that the illumination light, after traversing the collection lens 62 and reaching paper 14, illuminates a field of view of at least two by two pixels on the encoded paper 14.

The illumination light is reflected from different regions of the paper, depending on whether or not the region is printed with an ink that absorbs the light of the illuminating wavelength. The reflected light, which is an image made up of light and dark lines, is collected by the collection lens 62. The beam splitter 64 directs the reflected light through a lens 68 to a detector array 70 without changing the direction of the illumination light from LED's 50, 52 and 54. The detector 70 can be a matrix of photodiodes having, for example, 14 by 14 elements. Alternatively, a charge coupled device detector can be used.

The pen uses two detection modes, one for absolute position detection and one for relative position detection. When the pen is first placed on the paper, the absolute position of the pen is unknown, and the pen must operate in the absolute position detection mode. Once the absolute coordinate position of the pen on the paper is known, subsequent absolute positions can be determined by detecting the relative changes in X and Y coordinates with respect to the initial absolute position. Thus, the relative position detection mode can be used until the pen is lifted from the paper. In the absolute position detection mode, the detector array 70 receives an image of the illuminated area on the paper. As noted above, the field of view of the collection lens is at least two by two pixels so that one complete pixel is always included within the image. In the relative position detection mode, only one element of the detector array 70 is used to determine relative position. As the pen traverses the paper, the reflected intensity detected by the single element of detector array 70, typically the center element, changes depending on the pattern of each pixel.

The pulse rate of LED's 50, 52 and 54 is selected to ensure reliable reading of the encoded information from the paper at a maximum expected rate of pen movement (assumed to be 4 to 7 inches per second). As discussed below, the pixels typically have dimensions of about 0.8 to 1.1 millimeters and the width of a line in the pixel is about 0.1 millimeter. Thus, pen motion of one inch per second corresponds to about 28 pixels per second or 250 lines per second. In order to ensure a satisfactory signal-to-noise ratio, 100 data points per second are preferably obtained in the absolute position detection mode. The three LED's 50, 52 and 54 are turned on sequentially, thus providing an illumination pulse rate of 300 pulses per second. During relative position detection mode, each LED is preferably pulsed at a rate of 2500 times per second, thus providing an illumination pulse rate of 7500 pulses per second. This permits reading of 250 lines per second with a satisfactory signal-to-noise ratio. Since the detector array 70 must be synchronized with the LED's, the refresh rate of the detector array 70 should be 300 Hz in the absolute position detection mode. For a 14 by 14 detector array, this requires a detector clock rate of about 56 kHz. During relative position detection, only one of the elements of the detector array 70 is used for detection. The active element must be refreshed 7500 times per second for the above LED pulse rate. The response times of the photodiodes in detector array 70 must be faster than about 10 microseconds.

As noted above, the encoded paper 14 has a prerecorded pattern of pixels which contain encoded position information. The encoded position information permits the absolute position of the pen tip 18 to be determined simultaneously with writing. A continuous record of the path followed by the pen tip 18 is stored in recording unit 20. The path is specified in terms of the coordinates of the pixels on the encoded paper 14. Preferably, the pattern of pixels is a uniform X-Y grid pattern, including rows and columns of pixels. Preferably, the dimensions of the pixels are on the order of 0.8 to 1.1 millimeters in the X and Y directions.

Figure 4:
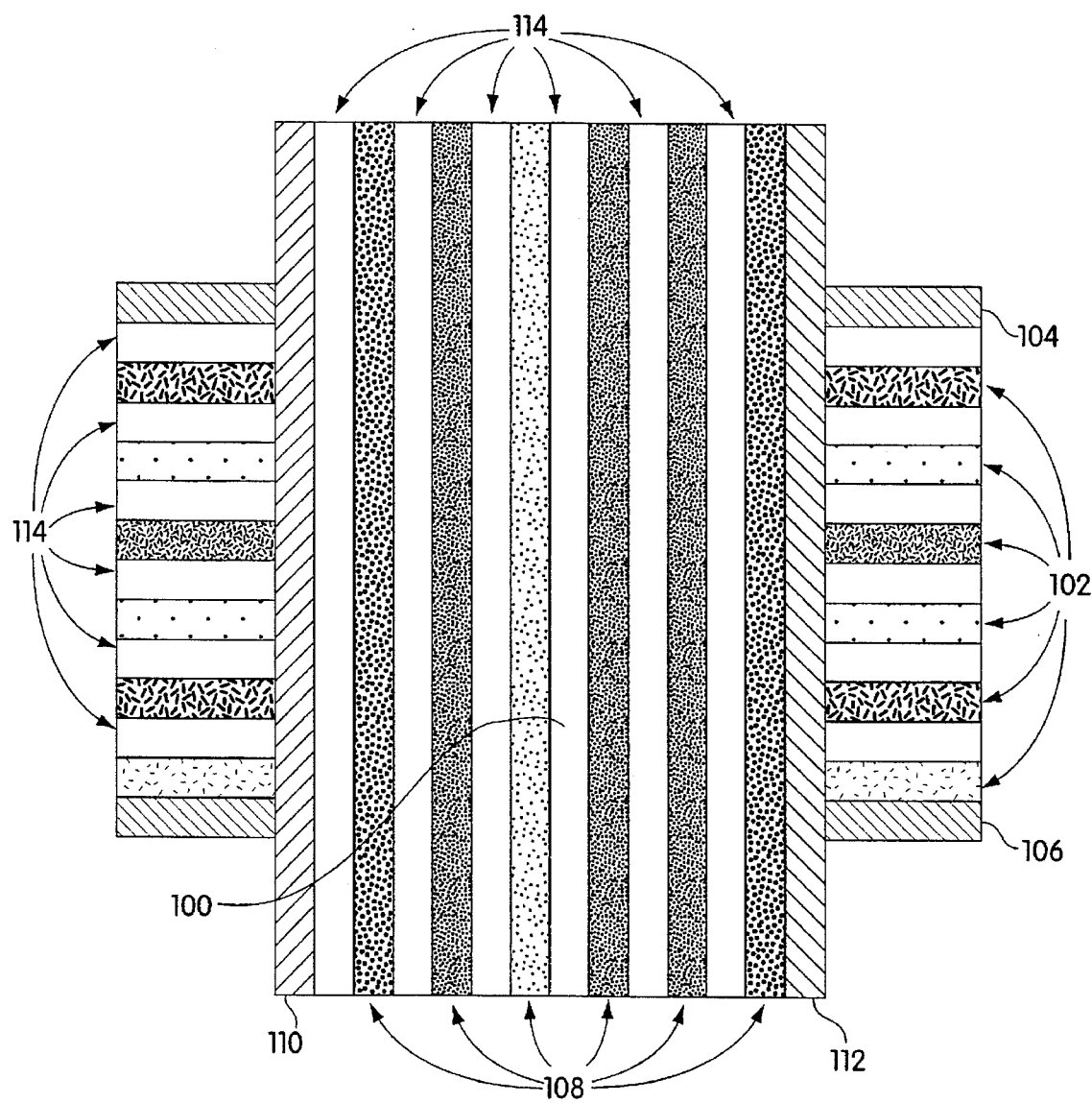
FIG. 4 is an enlarged representation of one example of a pixel used on the encoded paper.

A single pixel 100 is illustrated generally in FIG. 4. The pixel includes a plurality of horizontal data lines 102 between horizontal delimiter lines 104 and 106 and a plurality of vertical data lines 108 between vertical delimiter lines 110 and 112. The horizontal data lines 102 and the vertical data lines 108 are each spaced apart by spaces 114. The boundaries of the pixel 100 are established by the horizontal delimiter lines 104 and 106 and by the vertical delimiter lines 110 and 112. In a preferred embodiment, the horizontal data lines 102 and the vertical data lines 108 each have widths on the order of 50-100 micrometers and are separated by spaces 114 equal to the widths of the lines. The configuration shown in FIG. 4 is representative of one coding algorithm. As discussed below, spaces between lines are not used in some coding algorithms.

The pattern of pixels extends over the entire surface of the paper. Each pixel defines a unique coordinate position on the surface of the paper. The uniqueness of each pixel 100 is established by an algorithm which orders the vertical and horizontal data lines.

In a preferred coding algorithm discussed below, three different infrared inks are used, and the different lines are obtained by varying the amount of pigment in each of the three infrared inks. The horizontal delimiter lines 104 and 106 are printed with one of the three infrared inks containing a specified amount of a pigment. The vertical delimiter lines 110 and 112 are printed with the same ink, but with a different amount of pigment. Since the absorption levels of each of the inks varies according to the amount of pigment, each of the delimiter lines can be distinguished and identified. The delimiter lines permit the direction of pen motion and pixel identification to be determined. The horizontal data lines 102 and the vertical data lines 108 within the delimiter lines are printed with two different infrared inks, each with three different amounts of pigments. Each of these two inks provides three distinct levels at the absorption characteristic wavelength. A total of eight identifiable and distinct lines and the spacing between data lines provide the basis for an algorithm for determining position on the paper. The infrared inks are invisible to the human eye. The paper encoded with infrared ink can be blank, with no visible reference lines, can have horizontal visible reference lines as in conventional lined paper, or can have horizontal and vertical visible reference lines as in conventional grid paper.

Four coding algorithms are summarized in Table 1 below. In Table I, n represents the number of inks used in the coding algorithm, s represents the number of shades, or intensity levels; L represents the number of data lines in each pixel excluding delimiters; W represents the width of each line; Pix represents dimensions of each pixel; Size represents the paper dimensions; and m represents the number pixels in x and y directions. Coding algorithms C1 to C4 are illustrated in FIGS. 5A–5B, respectively.

TABLE I

| Algorithm | n | s | L | W/ mm | Pix/ mm | m | Size mm |
| --- | --- | --- | --- | --- | --- | --- | --- |
| $C_1$ | 12 | 1 | 6 | 0.1 | 0.8 | 972 | 778 |
| $C_2$ | 10 | 1 | 6 | 0.1 | 0.7 | 486 | 340 |
| $C_3$ | 5 | 3 | 6 | 0.1 | 0.7 | 729 | 510 |
| $C_4$ | 3 | 3* | 5 | 0.1 | 1.1 | 243 | 267 |

Figure 5A:
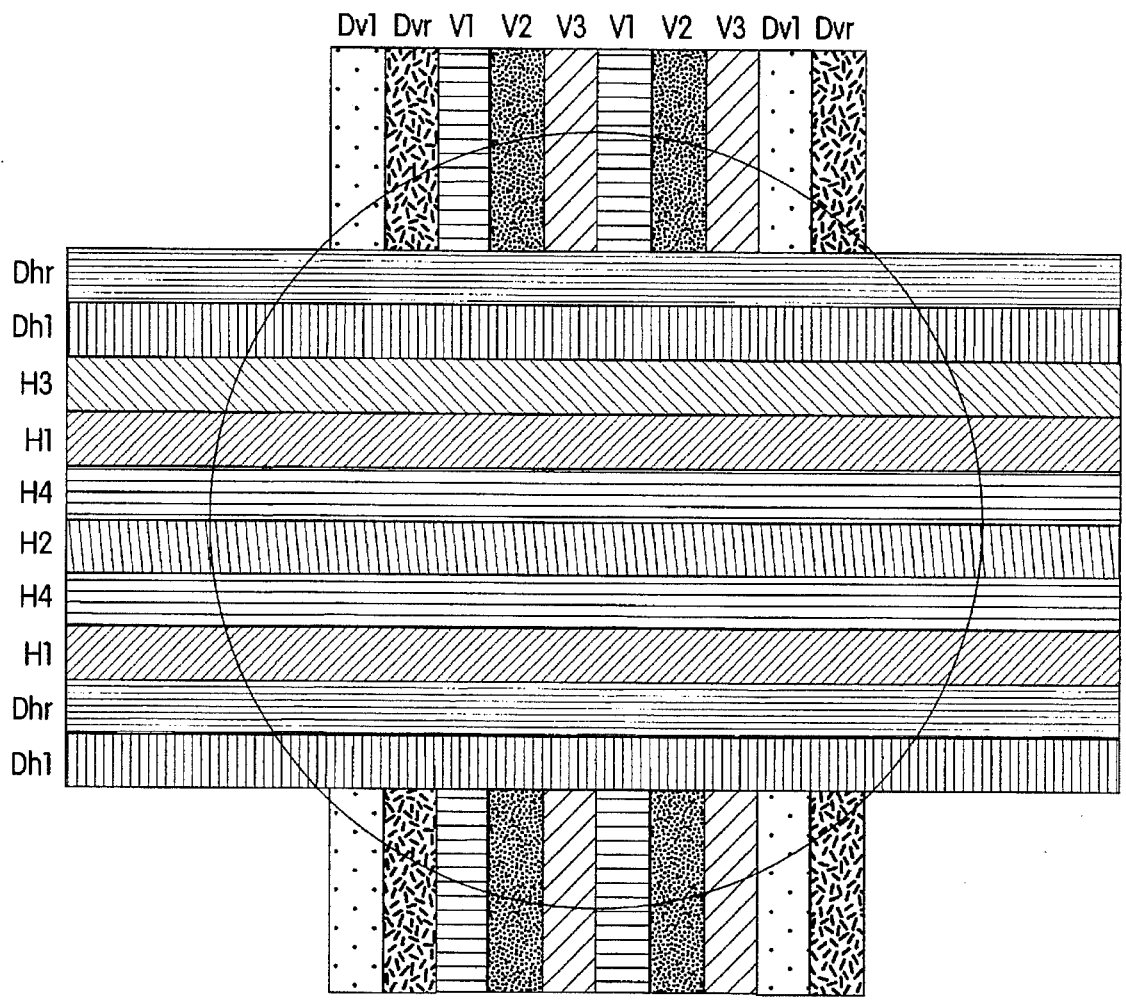
FIGS. 5A–5D are enlarged representations of pixels in accordance with different coding algorithms.
Figure 5B:
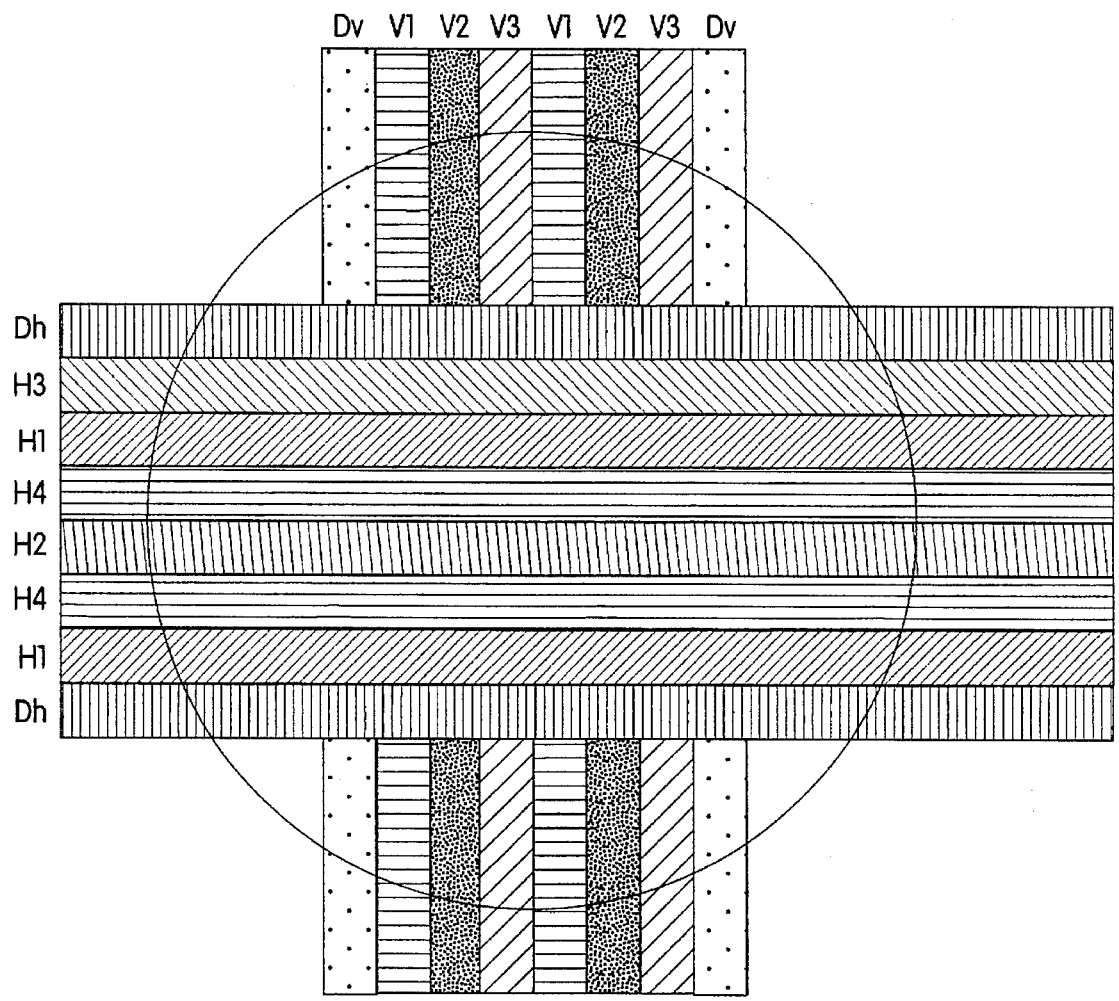

As shown in FIG. 5A, a pixel using the C1 coding algorithm summarized in Table I includes six vertical data lines and six horizontal data lines. Two lines are used for each delimiter. The inks for coding vertical data lines are represented by V1, V2, V3 and V4. The inks used for coding horizontal data lines are represented by H1, H2, H3 and H4. The inks used for coding vertical delimiters are represented by Dvl and Dvr; and the inks used for coding horizontal delimiters are represented by Dhl and Dhr. Coding algorithm C1 thus uses 12 different inks. The pixel shown in FIG. 5A represents the code [(1, 2, 3, 1, 2, 3), (3, 1, 4, 2, 4, 1)]. This code corresponds to a specific X-Y coordinate on the paper.

A pixel in accordance with the C2 coding algorithm summarized in Table I is shown in FIG. 5B. Each pixel includes six vertical data lines and six horizontal data lines. The inks used for coding vertical data lines are represented by V1, V2, V3 and V4; and the inks used for coding the horizontal data lines are represented by H1, H2, H3 and H4. The C2 coding algorithm uses single line delimiters. The ink used for coding the vertical delimiters is represented by Dv; and the ink used for coding the horizontal delimiters is represented by Dh.

Figure 5C:
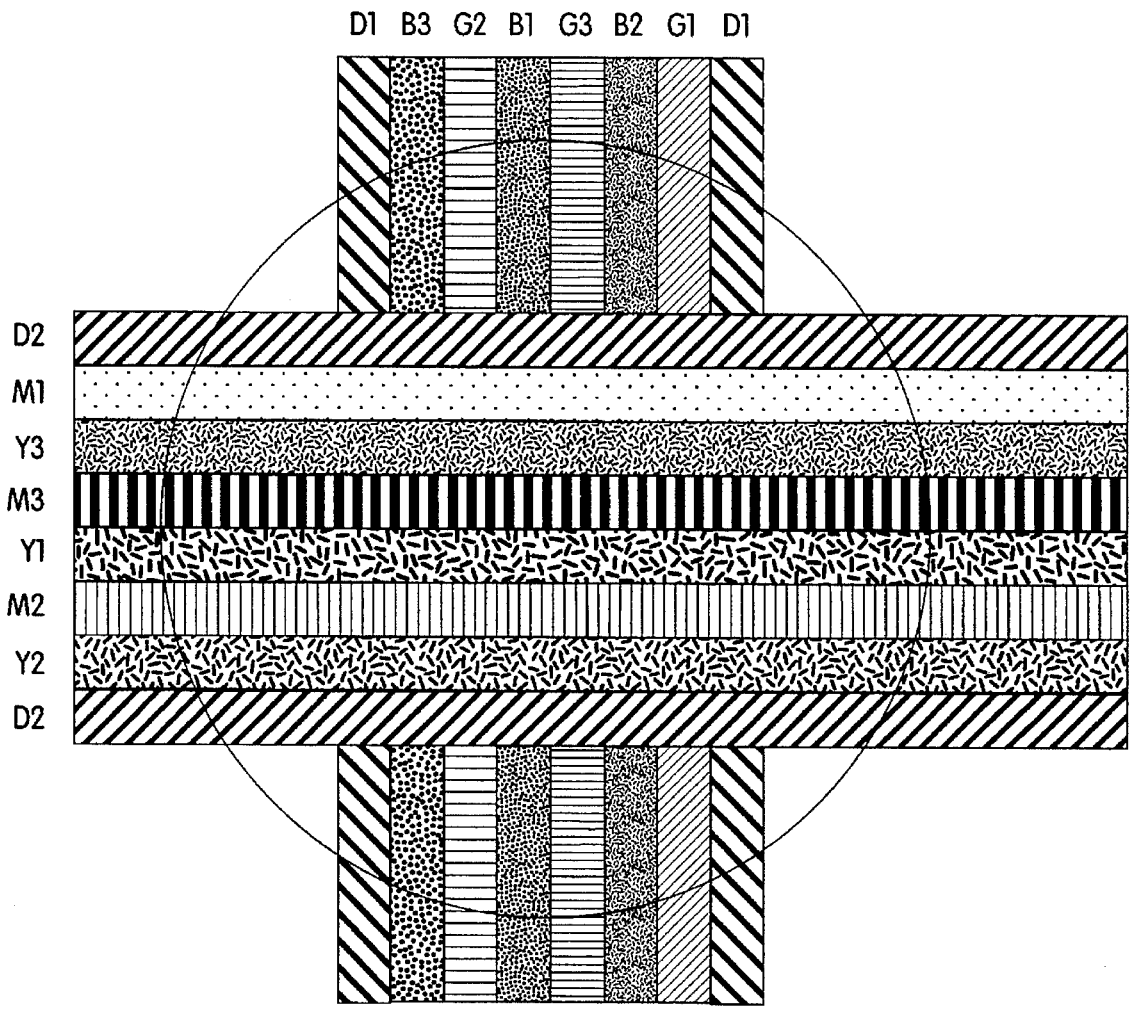

A pixel in accordance with the C3 coding algorithm summarized in Table I is shown in FIG. 5C. Each pixel includes six vertical data lines and six horizontal data lines. In the C3 coding algorithm, the inks used for coding vertical and horizontal data lines each have three shades; and the ink used for coding the delimiters has two shades. The inks used for coding the vertical data lines are represented by B1, B2 and B3 (different shades of ink B), and G1, G2 and G3 (different shades of ink G). The inks used for coding the horizontal data lines are represented by M1, M2 and M3 (different shades of ink M), and Y1, Y2 and Y3 (different shades of ink Y). The inks used for coding the vertical and horizontal delimiters are represented by D1, D2 (different shades of ink D).

Figure 5D:
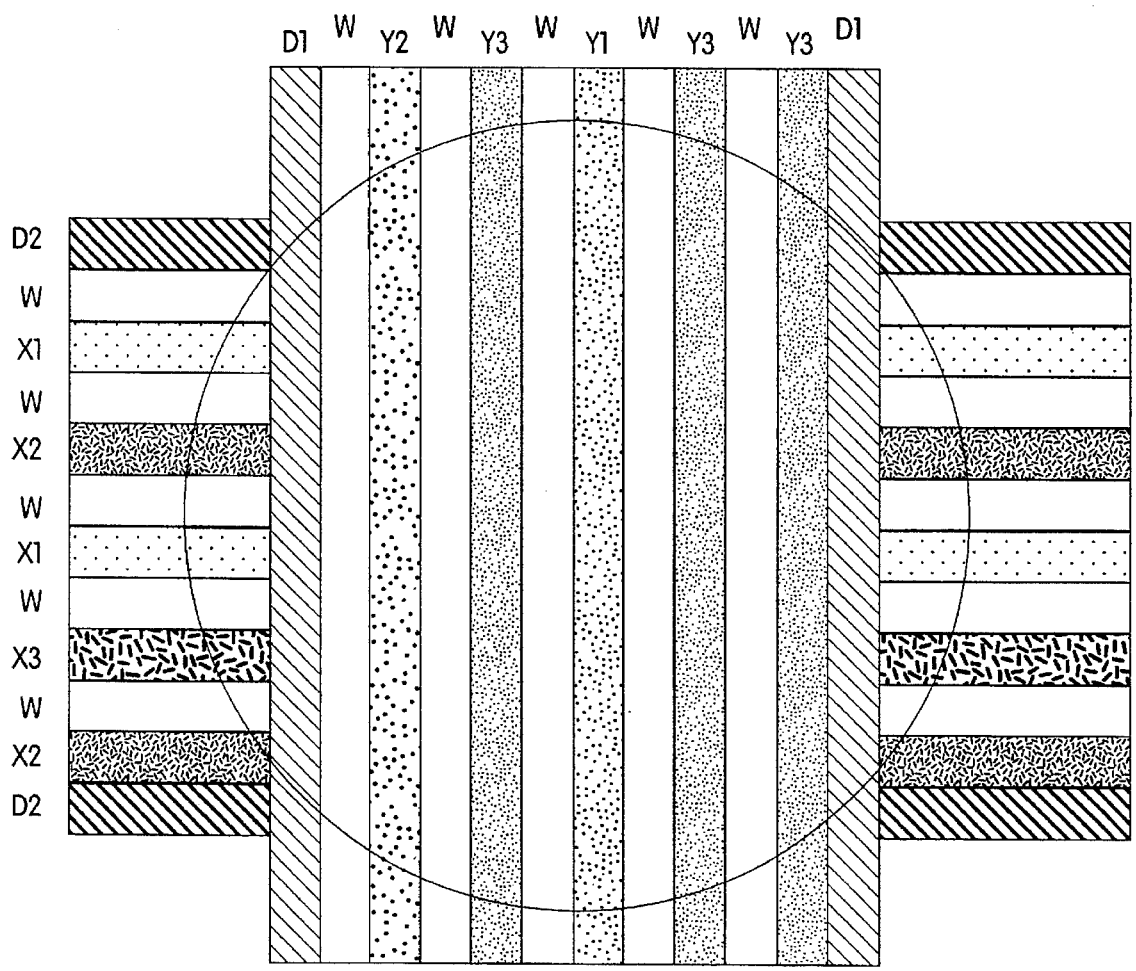

A pixel in accordance with the C4 coding algorithm summarized in Table I is shown in FIG. 5D. The pixel in accordance with the C4 coding algorithm differs from pixels shown in FIGS. 5A to 5C in having a space W between each pair of vertical data lines and a space W between each pair of horizontal data lines (as described in connection with FIG. 4). A single ink having three shades, Y1, Y2 and Y3, is used for coding the vertical data lines; and a single ink having three shades, X1, X2 and X3, is used for coding horizontal data lines. The vertical and horizontal delimiters are formed by two shades, D1 and D2, of ink D.

An example of the process steps for applying encoded information to the paper in accordance with the C4 coding algorithm is now described. Offset printing is preferably utilized. Prior to printing, two printing plates are fabricated. One plate contains the delimiter lines, and the other plate contains the data lines. The location and shade of each line is controlled using Postscript commands. The resulting images are formed in two printing plates, which are used in a printing press for forming the vertical delimiters and the vertical data lines. The same images with a 90° rotation are formed in two other printing plates for printing the horizontal delimiters and the horizontal data lines.

The inks for printing encoded information can be organic based infrared inks having different absorption wavelengths Different shades can be produced by changing the concentration of the compounds in the ink vehicle.

Figure 6A:
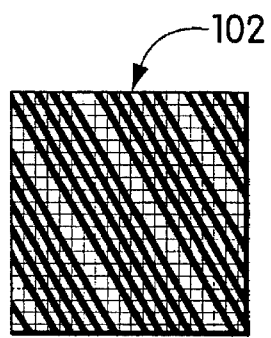
FIGS. 6A–6C are representations of the images detected using different illumination wavelengths and using the encoding algorithm shown in FIG. 5D.
Figure 6B:
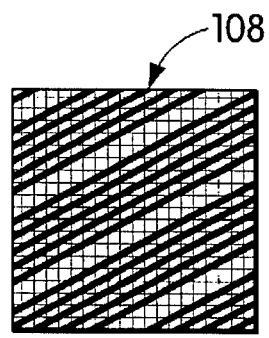
Figure 6C:
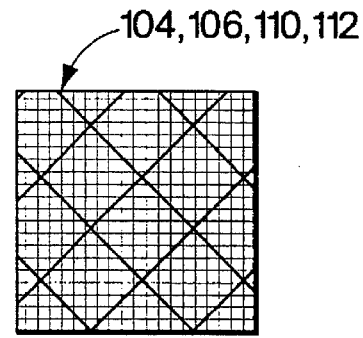

The images detected by the detector array 70, when the paper 14 is encoded using the encoding algorithm of FIG. 4, are shown in FIGS. 6A–6C. In FIGS. 6A–6C, the vertical and horizontal data lines and the delimiter lines are rotated with respect to the grid of the detector array for ease of illustration. With reference to FIGS. 3 and 5D, it is assumed that LED 50 corresponds to the absorption wavelength of the horizontal data lines 102, LED 52 corresponds to the absorption wavelength of the vertical data lines 108 and LED 54 corresponds to the absorption wavelength of the delimiter lines 104, 106, 110, 112. The detected image with LED 50 energized is shown in FIG. 6A. Spaced apart horizontal data lines 102 in groups of five are detected. The detected image with LED 52 energized is shown in FIG. 6B. Spaced apart groups of five vertical data lines 108 are detected. The detected image with LED 54 energized is shown in FIG. 6C, wherein the horizontal and vertical delimiters 104, 106, 110, 112 of each pixel are detected. From FIGS. 6A–6C, it is seen that different components of the pixels are detected at different times using different illumination wavelengths.

In further embodiments of the writing paper 14, different numbers of vertical and horizontal lines are used, and different numbers of infrared inks can be used, depending on the size of the pixels, the resolution of the position information and the algorithm used for determining absolute position.

Figure 7:
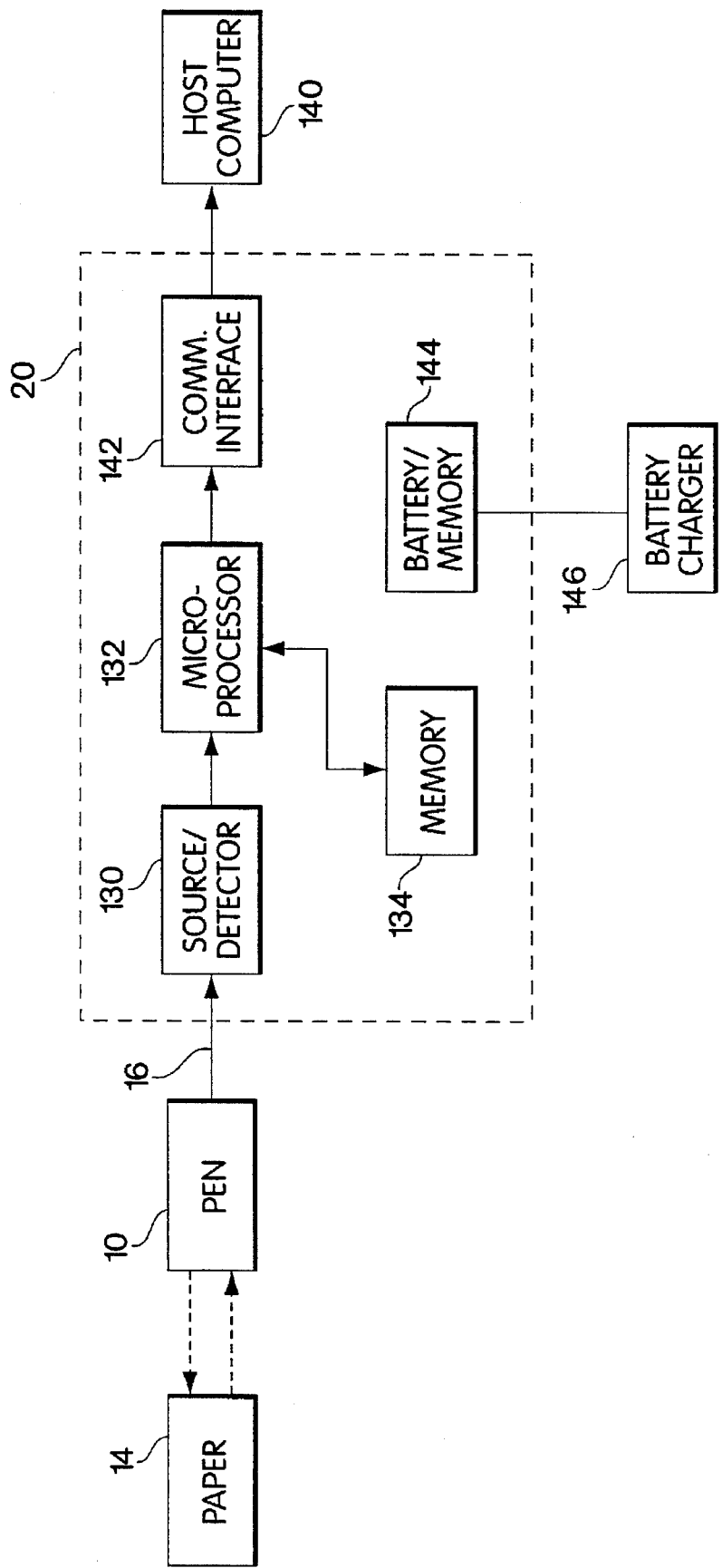
FIG. 7 is a block diagram of the information recording apparatus of the invention.

A block diagram of the information recording apparatus of the present invention is shown in FIG. 7. The recording unit 20 includes a source/detector controller 130 coupled through cable 16 to pen 10. The controller 130 energizes the LED's 50, 52 and 54 (FIG. 4) in sequence, as described above, and receives detected signals from detector array 70 (FIG. 4). As noted above the LED's 50, 52 and 54 can be located in the pen 10 or in the recording unit 20. The source/detector controller 130 is controlled by a microprocessor 132 which can, for example, be a type 80486 available from Intel. The source/detector controller 130 provides detected signals representative of pen tip location to microprocessor 132. The microprocessor 132 decodes the detected signals, synthesizes and compresses the coordinate data and checks the system for failures. The coordinate data is stored by microprocessor 132 in a memory 134.

The microprocessor 132 communicates with a host computer 140 through a communication interface 142. In a preferred embodiment, communication interface 142 utilizes an RS232 serial communication protocol. Other communication protocols, such as Ethernet, LAN Talk, RS485, RS422 and others, can be utilized. As noted previously, the recording unit 20 is required to be connected to host computer 140 only for transfer of data. At other times, the information recording apparatus can operate independently of the host computer 140. When data transfer is desired, the microprocessor 132 reads coordinate data from memory 134 and transmits it to the host computer 140. The coordinate data can be displayed, printed, stored or processed in any other desired manner by host computer 140.

The recording unit 20 further includes a battery/memory pack 144 which supplies power for the recording unit 20 and any devices in pen 10 which require operating power. The additional memory in the battery/memory pack 144 is used for added storage capability that may be required in portable applications of the information recording apparatus. A battery charger 146 external to the recording unit 20 is used when required to recharge the batteries in recording unit 20. The battery charger 146 permits the recording unit 20 to be recharged at any desired location, such as the office, home or automobile.

Figure 8:
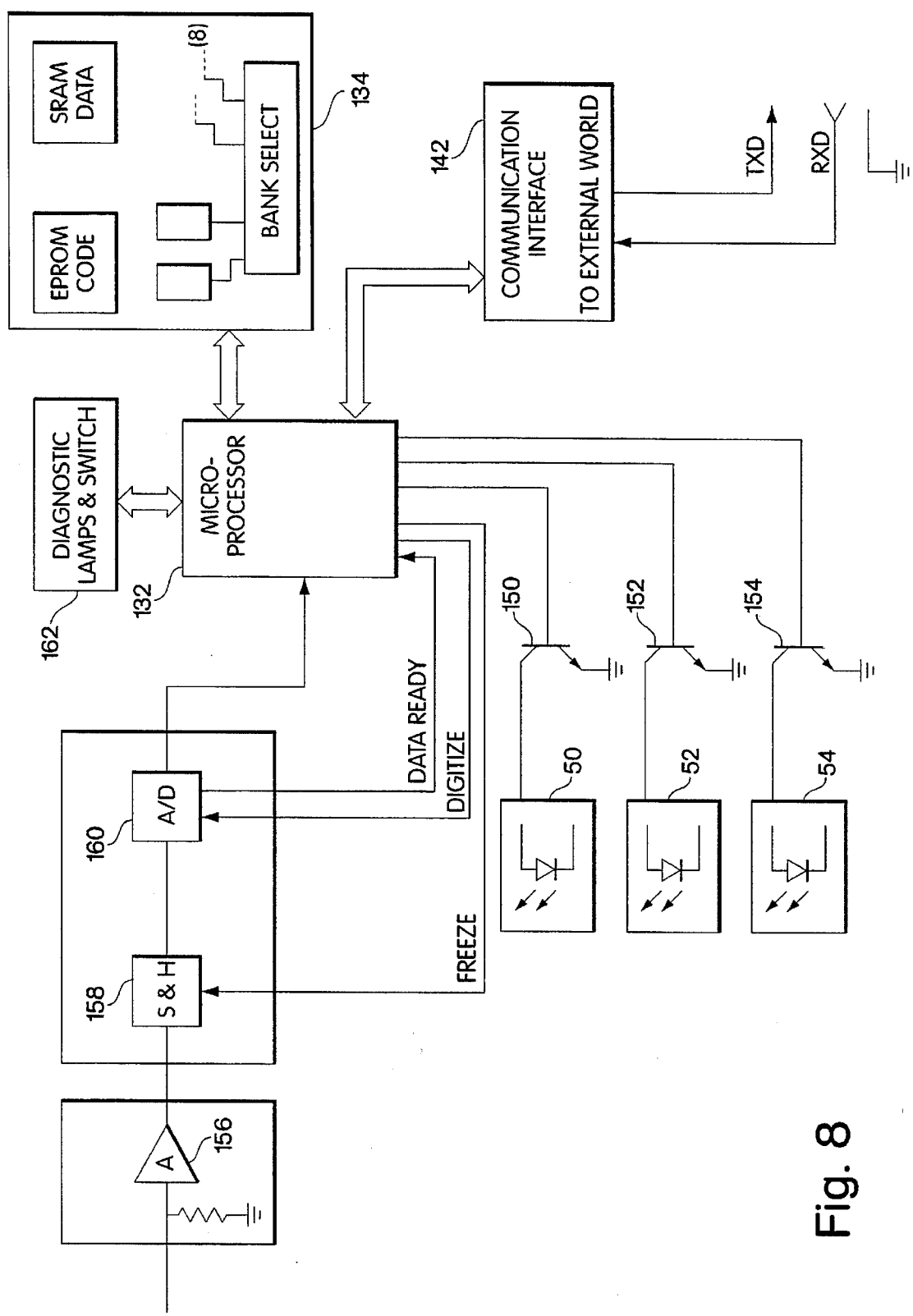
FIG. 8 is a block diagram of the recording unit.

A block diagram of the recording unit 20 is shown in FIG. 8. LED's 50, 52 and 54, which can be located in pen 10 as shown in FIG. 3 or in recording unit 20, supply light beams for reading encoded information on paper 14. When the LED's 50, 52 and 54 are located in recording unit 20, their light beams are carried through one or more optical fibers in cable 16 to pen 10. The LED's 50, 52 and 54 are sequentially energized with short pulses by microprocessor 132 through driver transistors 150, 152 and 154, respectively. The reflected light from the pixels where the pen tip is located is detected by the detector array 70 (FIG. 3) and is converted to an electrical signal. The detected signal is carried through cable 16 to the recording unit 20. The detected signal is supplied through an amplifier 156 to a sample-and-hold circuit 158. The samples are supplied to an analog-to-digital converter 160, which digitizes the sampled signal and supplies the digital samples to microprocessor 132. The microprocessor 132 performs preprocessing, encoding and decoding of the digital samples received from analog-to-digital converter 160. Processed data can be stored in memory 134, passed through communication interface 142 to the host computer, or both. A circuit 162 connected to microprocessor 132 performs diagnostics and operates lamps and switches on the recording unit 20.

Figure 9:
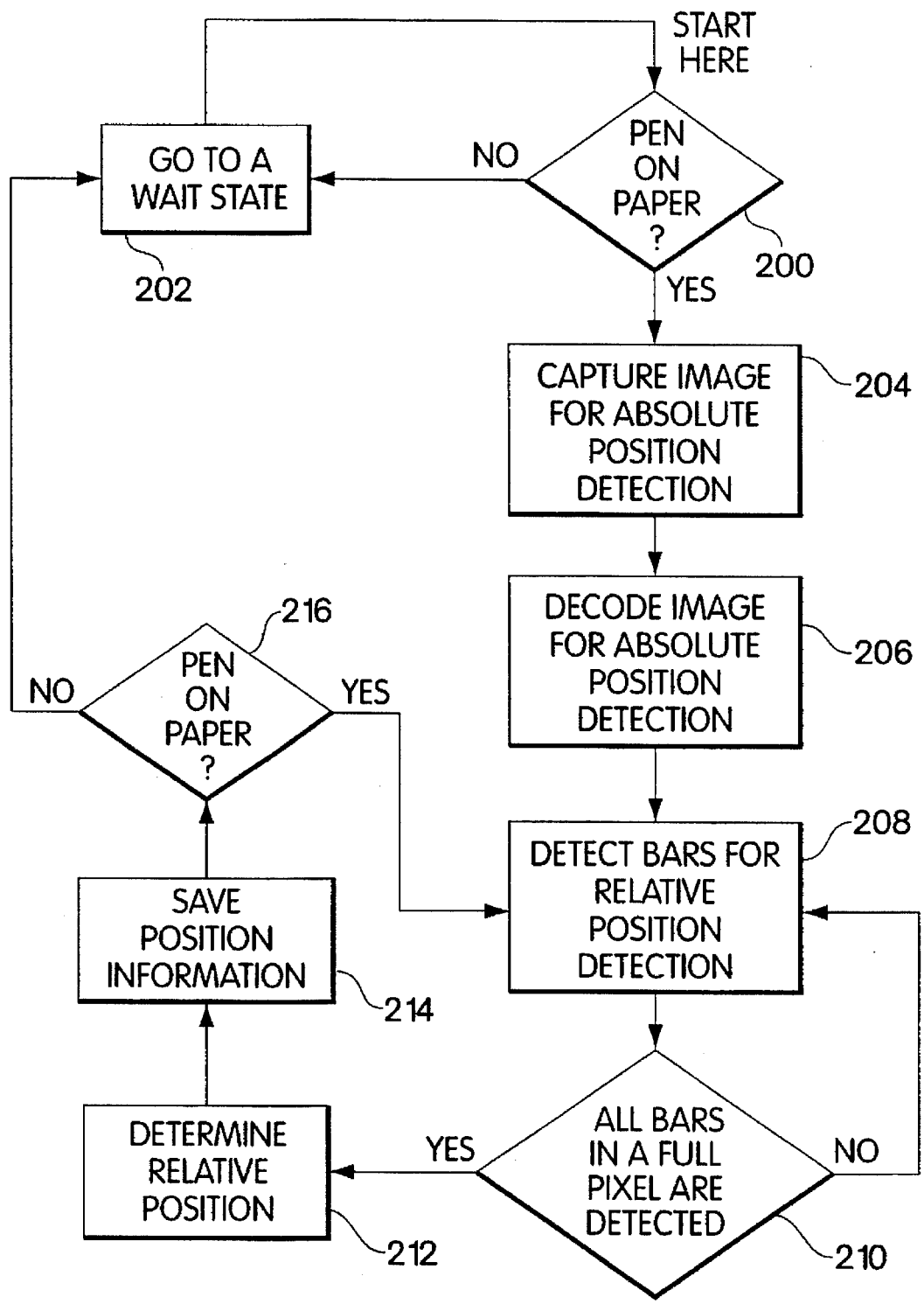
FIG. 9 is a flow diagram of a preferred process for reading position information from the encoded paper.

A flow diagram of a preferred process for reading encoded information from paper 14 is shown in FIG. 9. In step 200, the read process determines if pen 10 is in contact with paper 14. When the paper is not in contact with the paper, the process remains in a wait state in step 202. When the pen is in contact with the paper surface, an image is obtained for absolute position detection in step 204. The image of the pixel is decoded in step 206 for absolute position detection. After the absolute position of the pen has been determined, the relative position can be determined as a displacement from the previous position. The relative position is determined in step 208 by detecting lines in each pixel. In step 210, the process determines whether all the lines in a full pixel have been detected. When all lines have not been detected, the process returns to step 208 and detects additional lines. When the lines in a full pixel have been detected, the relative position is determined in step 212. The relative position information is saved in step 214. If the pen remains in contact with the paper as determined in step 216, additional relative position information is detected and stored in steps 208, 210, 212 and 214. When the pen is removed from the paper, the process returns to the wait state, as indicated in step 202.

Figure 10:
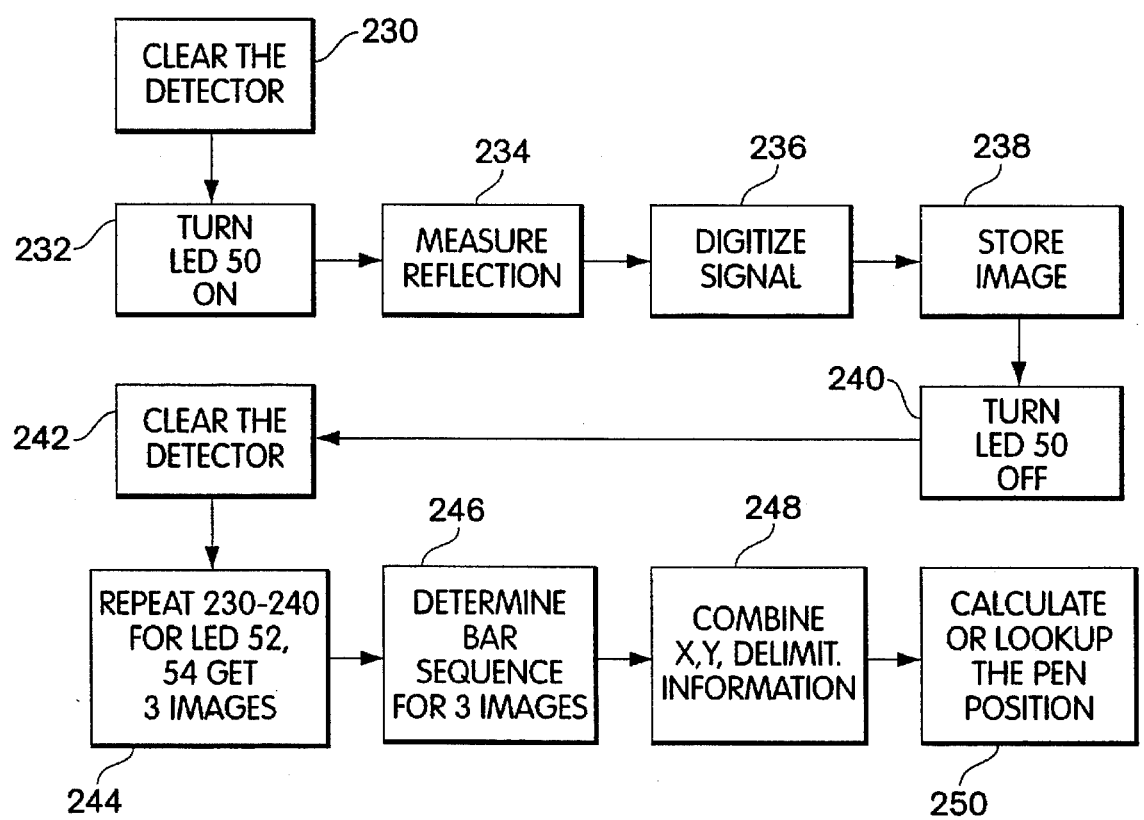
FIG. 10 is a flow diagram of a preferred process for reading absolute position information from the encoded paper.

A flow diagram of a preferred process for obtaining an image for absolute position detection (step 204 in FIG. 9) is shown in FIG. 10. Initially, the detector array 70 (FIG. 3) is cleared in step 230. LED 50 is energized in step 232, and an image is sensed by detector array 70 in step 234. The detected signal is digitized in step 236, and the digitized signal is stored by the recording unit 20 in step 238. Next, the LED 50 is turned off in step 240, and the detector array is cleared in step 242. Then, steps 232–242 are repeated in sequence for LED's 52 and 54 in step 244 to produce images of the vertical and horizontal data lines and the delimiter lines. The data lines and the delimiter lines are detected as three separate images, as shown in FIGS. 6A–6C. The line sequence for the three images is determined in step 246. The information is combined in step 248, and the absolute pen position is calculated or looked up in a table in step 250.

Figure 11:
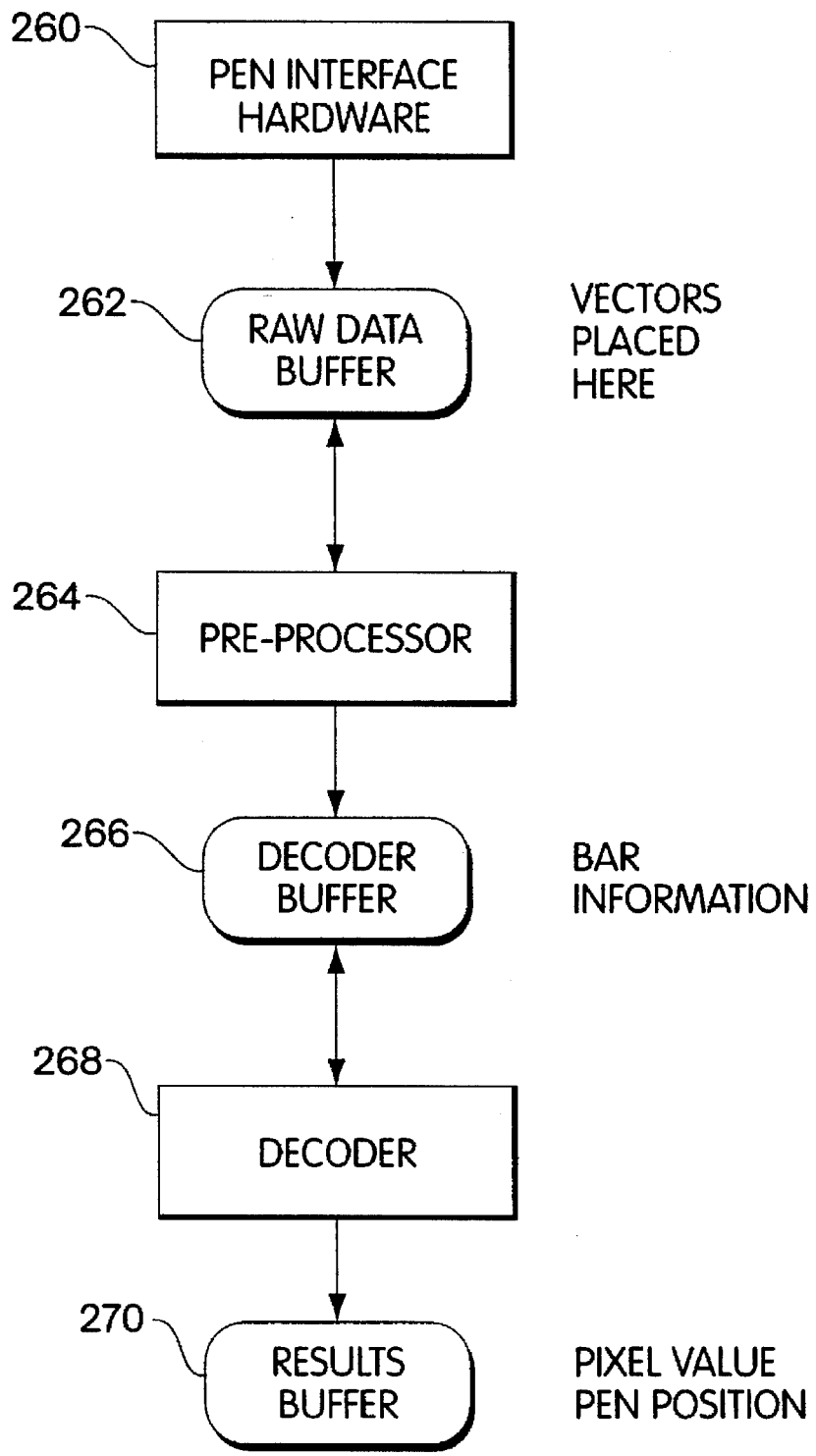
FIG. 11 is a schematic diagram showing the organization of the software in the information recording apparatus of the invention.

The overall organization of the software operating on microprocessor 132 (FIG. 7) is illustrated in FIG. 11. The code is organized in a multi-tasking architecture consisting of several independently running modules. These modules share information through common memory available as mailboxes. Each module has a default mailbox and can own as many mailboxes as required. Any module can send a message to a mailbox, but only its owner can read the mailbox. A task is not scheduled for execution when it is waiting on an empty mailbox.

A hardware module 260 is driven by timer interrupts. When triggered, the hardware module 260 turns on the LED's 50, 52 and 54 in sequence and reads the detected signal, as shown in FIGS. 9 and 10 and described above. The data is saved as COLOR: Intensity vector, in a raw data buffer 262.

A preprocessor module 264, which is triggered every fourth hardware interrupt based on the number of LED's in the system, translates the vector information into pen movement. If there is no pen movement, the current cycle is ignored. Otherwise, the line value is computed from the vectors and is placed in a decoder buffer 266.

A decoder module 268 reads the decoder buffer 266 and translates the information into coordinate information. If no historical data is available, then the information becomes the starting value. Otherwise, the information is used as a consistency check value for the value determined by adding line movements to the initial value. The results are placed in a results buffer 270, which contains a pixel value and pen position.

The C4 encoding algorithm can be used to encode a pattern on the paper such that two adjacent pixels differ from each other by only one vertical (X axis) line and by only horizontal (Y axis) line. This is accomplished by encoding both the horizontal and vertical lines in each pixel with the use of a Gray Code.

The details of the C4 decoding algorithm will now be described. The C4 decoding algorithm is required to read the position information on the C4 encoded paper. The paper is encoded using Gray Code, where exactly one bit or line is different between consecutive pixels. The encoding algorithm is described in detail above. The decoding algorithm registers and locates the pixels over which the pen moves. This task is accomplished by a number of subtasks. In general, these tasks register data read by the pen and transform it to locate the position of the pen at any given instant. The data has to be read carefully and rapidly because the pen is continuously reading, even when the pen is stationary on or off the paper. First, the assumptions which are made in the decoding process are described. Then, the methodology used to store and process the data received from the pen are described.

The following assumptions are made in the decoding of the C4 coded paper.

1. An assumption which is significant to the decoding process is that the data being processed is error free. Thus, no error checking or correction is performed.

2. Let number of lines in a pixel be L.

Let number of inks be i.

Let number of shades of an ink be s.

It is assumed that the line configuration on the C4 paper, or the encoding algorithm, is as follows:

If $s \geq 2$ AND $s \leq 5$, then the lines are encoded using the Gray code.

If $s < 2$ OR $s \geq 5$, then undefined.

(The limitations of five shades is justified in the next section).

3. For a particular axis, s+2 types of lines can be encountered by the pen;

There are s different shades of lines.

Blank spaces between lines.

Delimiter lines.

The method used to register the segment drawn by the pen comprises four steps:

1. Find the starting position of the pen ($Px_{start}$, $Py_{start}$).
2. For each pixel over which the pen moves, calculate the absolute position ($Px_{ab}$, $Px_{ab}$) of the pen.
3. Calculate the corresponding $\Delta$ (delta) direction in which the pen moves.
4. Perform a consistency check.

STEP 1

The decoding of the C4 coded paper starts when the line pair representations, called B vectors, are provided by the hardware electronics. The B vectors are of the form:

$$B_n = 00\ XXX\ YYY$$

where $B_n$, of byte size, corresponds to the position of the pen on the paper at an instance n. The three least significant bits "YYY" store the Y-axis line's property that is denoted by $B(Y)_n$. The next three bits "XXX" store the X-axis line's property that is denoted by $B(X)_n$. The properties could be any of the s+2 types of lines: s number of shades, a delimiter or a blank line. For instance, if two shades of inks (s=2) were used, then

| B(Y) = 0 | | shade 1 line |
|---|---|---|
| | OR | |
| B(Y) = 1 | | shade 2 line |
| | OR | |
| B(Y) = 2 | | blank line |
| | OR | |
| B(Y) = 3 | | delimiter line |

Similarly, the three XXX bits are assigned the same decimal values for X-axis lines properties, except the shades inherently are of different ink. The two most significant bits of the B vector are left empty (equal to zero) and may be used in the future if the need arises.

Since X and Y line properties are stored in three bits, the maximum decimal number which may be stored is seven. Thus, the number of shades of an ink used to encode pixels is limited to five. Table II below shows how the information is interpreted from the B vector if s=2.

TABLE II

| $B_n$ (binary) | $B(X)_n$ | $B(Y)_n$ | overlapping bar (properties) | |
|---|---|---|---|---|
| 00 XXX YYY | (decimal) | (decimal) | x-axis bar | y-axis bar |
| 00 000 010 | 0 | 2 | shade 1 | blank bar |
| 00 001 000 | 1 | 0 | shade 2 | shade 1 |
| 00 011 010 | 3 | 2 | delimeter bar | blank bar |
| 00 001 011 | 1 | 3 | shade 2 | delimiter bar |

The B vector provides the location of the pen with respect to X and Y lines. The pen has to move at least L lines vertically and horizontally before a complete pixel can be registered and the absolute position of the pen calculated. Thus, the pen may move horizontally through several pixels, but it's position on the paper could not be calculated unless it has also traversed a complete pixel in the vertical direction. The following generalizes this scenario:

If the movement of the pen registers n B vectors, where $$B_i \text{ such that } 0 < i < n - L$$

then one of the following three cases may be true:

Case 1:

$$B(X)_i, B(X)_{i+1}, \ldots B(X)_{i+(L-1)} \neq \text{delimiter bar}$$

then the X coordinate of the segment drawn by the pen is:

$$Px_{start} = B(X)_i\ B(X)_{i+1} \ldots B(X)_{i+(L-1)}$$

Case 2:

$$B(Y)_i, B(Y)_{i+1}, \ldots B(Y)_{i+(L-1)} \neq \text{delimiter bar}$$

then the Y coordinate of the segment drawn by the pen is:

$$Py_{start} = B(Y)_i\ B(Y)_{i+1} \ldots B(Y)_{i+(L-1)}$$

Case 3:

$$B(X)_i, B(X)_{i+1}, \ldots B(X)_{i+(L-1)} \neq \text{delimiter bar}$$

AND $B(Y)_i, B(Y)_{i+1}, \ldots B(Y)_{i+(L-1)} \ne$ delimiter bar then the X and Y coordinates of the segment drawn by the pen can be calculated as follows:

$(Px_{start}, Py_{start}) = (B(X)_i, B(X)_{i+1} \ldots B(X)_{i+(L-1)}, B(Y)_i, B(Y)_{i+1} \ldots B(Y)_{i+(L-1)})$

STEP 2

This step involves registering the absolute value of the pixels, $(Px_{ab}, Py_{ab})$, over which the pen has traversed after $(Px_{start}, Py_{start})$. A series of B vectors is produced when the pen moves over the paper. These vectors are translated into absolute position of the pen as shown in Step 1.

STEP 3

Figure 12:
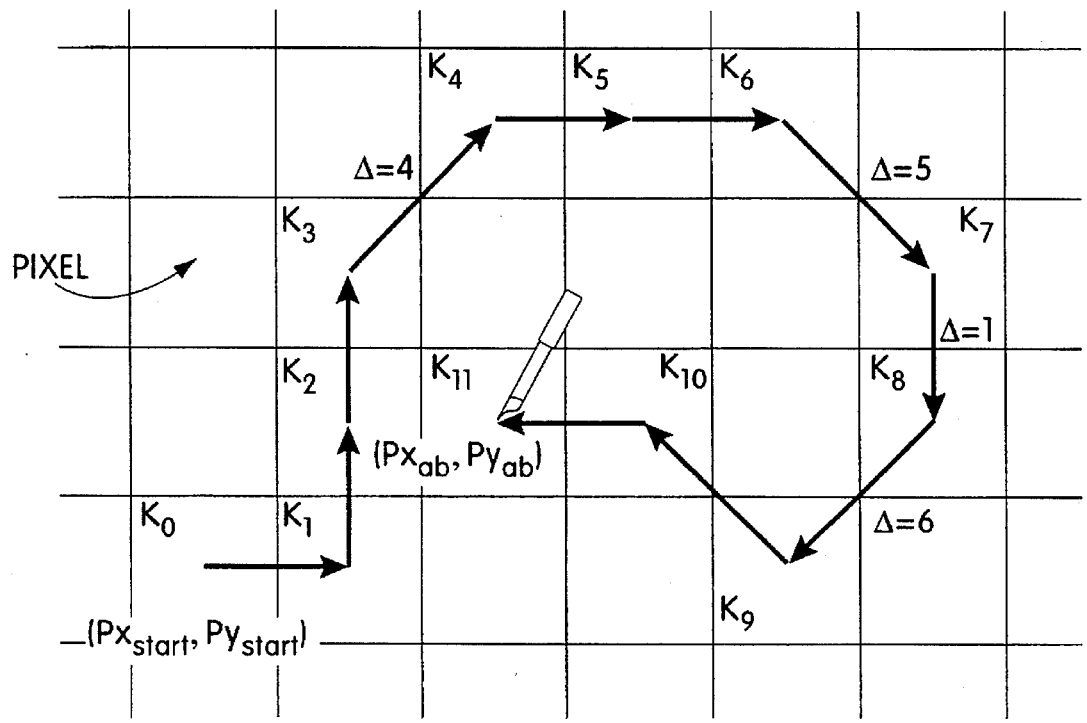
FIG. 12 illustrates an example of pen movement over pixels in accordance with the present invention.
Figure 13:
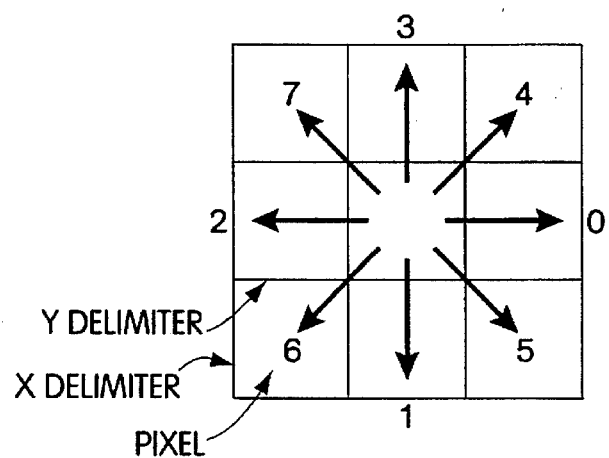
FIG. 13 is a schematic diagram showing the directions in which the pen may move relative to a given pixel.

This step calculates the direction $\Delta$ in which the pen moves from $(Px_{ab-1}, Py_{ab-1})$ to $(Px_{ab}, Py_{ab})$. The possible directions are shown in FIG. 13. FIG. 12 shows some of the $\Delta$ values which are recorded as the pen moves on the paper.

To find $\Delta$, a look-up table for Gray Code is needed. The values of $\Delta$ are calculated in the following manner.
Let u and v be defined as follows:
u such that Gray $(u) = Px_{ab}$
v such that Gray $(v) = Py_{ab}$
Check for horizontal pen movement:

If $(Py_{ab} = Py_{ab-1})$ then if $(Gray(u) = Px_{ab}$ AND $Gray(u-1) = Px_{ab-1})$ then $\Delta = 0$ else if $(Gray(u) = Px_{ab}$ AND $Gray(u+1) = Px_{ab-1})$ then $\Delta = 2$
Check for vertical pen movement:

If $(Px_{ab} = Py_{ab-1})$ then if $(Gray(v) = Py_{ab}$ AND $Gray(v-1) = Py_{ab-1})$ then $\Delta = 3$ else if $(Gray(v) = Py_{ab}$ AND $Gray(v+1) = Py_{ab-1})$ then $\Delta = 1$
Check for diagonal pen movement:

If $(Px_{ab} \ne Px_{ab-1})$ AND $(Py_{ab} \ne Py_{ab-1})$
then
if $(Gray(u) = Px_{ab}$ AND $Gray(u-1) = Px_{ab-1})$
then if $(Gray(v) = Py_{ab}$ AND $Gray(v-1) = Py_{ab-1})$
then $\Delta = 4$
else $\Delta = 5$
else if $(Gray(u) = Px_{ab}$ AND $Gray(u+1) = Px_{ab-1})$
then if $(Gray(v) = Py_{ab}$ AND $Gray(v-1) = Py_{ab-1})$
then $\Delta = 7$
else $\Delta = 6$

STEP 4

A final task is to perform a test to check if the data being recorded is consistent. To perform this consistency check, the following equation is calculated.

$(Px_{ab}, Py_{ab}) = \Sigma(\kappa) + (Px_{start}, Py_{start})$ where $\kappa$ specifies the number of pixels traversed from $(Px_{start}, Py_{start})$ to $(Px_{ab}, Py_{ab})$. Refer to FIG. 12 to observe how $\kappa$ changes as the pen moves over the pixels.

In one example of an application of the present invention, a student uses the information recording apparatus for taking class notes. Lecture notes are written with the pen on the encoded paper. The written and coordinate data are simultaneously recorded on the paper and in memory. At a later time, the data can be displayed on a host computer.

Another application of the present invention is in a sales book. Entries made by a salesman for each business transaction are stored in the memory and can be accessed by a host computer at the end of the day or the end of the week for further processing. The sales book can be used in the field or in a retail store. The information recording apparatus of the present invention provides a written copy of the sales transaction on paper and a record in memory. Other forms that can be configured in accordance with the present invention include bank checks, legal forms, credit application, bank forms and other forms requiring a record of a transaction.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Information recording apparatus for use with an encoded writing surface having a prerecorded pattern of pixels, each of said pixels containing optically readable absolute position information which identifies the location of the pixel on said writing surface, said apparatus comprising:

a pen having a tip and including means for making visible markings on said writing surface and means for detecting the position of said tip on said writing surface by optically reading the pixels and obtaining said absolute position information when said tip is in contact with said surface and visible markings are made on said writing surface, said means for detecting the position of said tip including means for transmitting a light beam to said pattern of pixels and means for detecting reflected light from said pattern of pixels, said means for transmitting comprising a plurality of light emitting diodes, wherein said light emitting diodes have different transmission wavelengths and are energized sequentially; and a recording unit coupled to said pen and responsive to the absolute position information read by said detecting means for electronically recording the position of the tip of said pen on said writing surface as the visible markings are made on said writing surface so that said recording unit contains an electronic representation of the visible markings on said writing surface.

2. Information recording apparatus as defined in claim 1 wherein said visible markings made by said pen are substantially transparent to infrared radiation.

3. Information recording apparatus as defined in claim 1 wherein said light beam comprises radiation in a wavelength range including infrared radiation.

4. Information recording apparatus as defined in claim 1 wherein said pen is connected to said recording unit by one or more optical fibers.

5. Information recording apparatus as defined in claim 1 wherein said means for detecting said reflected light comprises a detector array.

6. Information recording apparatus as defined in claim 5 wherein said detector array has a viewing area of at least 2 by 2 pixels.

7. Information recording apparatus as defined in claim 5 wherein each of said pixels comprises a first plurality of vertical data lines for encoding an X coordinate of the pixel, a second plurality of horizontal data lines for encoding a Y coordinate of the pixel and vertical and horizontal delimiter lines for delimiting a boundary of the pixel.

8. Information recording apparatus as defined in claim 7 wherein said light emitting diodes include a first light emitting diode for transmitting a wavelength that is reflected by said vertical data lines, a second light emitting diode for transmitting a wavelength that is reflected by said horizontal data lines and a third light emitting diode for transmitting a wavelength that is reflected by said vertical and horizontal delimiter lines.

9. Information recording apparatus as defined in claim 1 wherein said recording unit includes means for detecting absolute position information of said pen on said writing surface when said tip is first brought into contact with said surface.

10. Information recording apparatus as defined in claim 9 wherein said recording unit further includes means for detecting the relative position of said pen on said writing surface as said tip is moved on said surface.

11. Information recording apparatus as defined in claim 1 wherein said means for making visible markings comprises a fountain pen.

12. A writing sheet comprising a writing surface and a prerecorded pattern of pixels associated with the writing surface, each of said pixels containing encoded, optically readable position information which identifies an absolute coordinate position on said writing surface and yet is invisible to a human eye, each of said pixels comprising a first plurality of vertical data lines for encoding an X-coordinate of the pixel and a second plurality of horizontal data lines for encoding a Y-coordinate of the pixel, said data lines having predetermined widths and spacings, one of said first plurality of vertical data lines and said second plurality of horizontal data lines overlying the other in each of said pixels.

13. A writing sheet as defined in claim 12 wherein each of said pixels includes vertical and horizontal delimiter lines for delimiting a boundary of the pixel.

14. A writing sheet as defined in claim 13 wherein said vertical and horizontal data lines and said delimiter lines are formed by infrared inks.

15. A writing sheet as defined in claim 14 wherein said infrared inks include organic pigments.

16. A writing sheet as defined in claim 12 wherein said position information is encoded by different shades of said vertical and horizontal data lines.

17. A writing sheet comprising a writing surface and a prerecorded pattern of pixels associated with the writing surface, each of said pixels containing encoded, optically readable position information which identifies an absolute coordinate position on said writing surface and yet is invisible to a human eye, each of said pixels comprising a first plurality of vertical data lines for encoding an X-coordinate of the pixel and a second plurality of horizontal data lines for encoding a Y-coordinate of the pixel, one of said first plurality of vertical data lines and said second plurality of horizontal data lines overlying the other in each of said pixels, wherein said vertical data lines are spaced apart and have widths in the range of 50–150 micrometers and wherein said horizontal data lines are spaced apart and have widths in the range of 50–150 micrometers.

18. A writing sheet as defined in claim 12 wherein said vertical and horizontal data lines are formed on said writing surface.

19. A writing sheet as defined in claim 12 wherein said vertical and horizontal lines underlie said writing surface and are optically readable through said writing surface.

20. A writing sheet as defined in claim 12 wherein said each of said pixels contains a line code for encoding position information.

21. Information recording apparatus comprising:
a writing paper including a writing surface and a prerecorded pattern of pixels associated with the writing surface, each of said pixels containing encoded, optically readable position information which identifies an absolute coordinate position on said writing surface, each of said pixels comprising a first plurality of vertical data lines for encoding an X-coordinate of the pixel and a second plurality of horizontal data lines for encoding a Y-coordinate of the pixel, said data lines having predetermined widths and spacings, each of said pixels further including vertical and horizontal delimiter lines for delimiting a boundary of the pixel, one of said first plurality of vertical data lines and said second plurality of horizontal data lines overlying the other in each of said pixels;
a pen having a tip and including means for making visible markings on said writing surface and means for detecting the position of said tip on said writing surface by optically reading the pixels and obtaining position information when said tip is in contact with said surface and visible markings are made on said writing surface; and
a recording unit coupled to said pen and responsive to the position information read by said detecting means for electronically recording the position of the tip of said pen on said writing surface as the visible markings are made on said writing surface so that said recording unit contains an electronic representation of the visible markings on said writing surface.

22. Information recording apparatus as defined in claim 21 wherein said recording unit includes a portable housing separate from said pen and electronic circuitry located within said housing for receiving position information from said detecting means and for storing said position information.

23. A writing sheet as defined in claim 21 wherein said vertical and horizontal data lines and said delimiter lines are formed by infrared inks.

24. Information recording apparatus as defined in claim 21 wherein said vertical data lines are spaced apart and have widths in the range of 50–150 micrometers and wherein said horizontal data lines are spaced apart and have widths in the range of 50–150 micrometers.

* * * * *